United States Patent [19]

Kanamori

[11] Patent Number: 5,223,164

[45] Date of Patent: Jun. 29, 1993

[54] RUST AND CORROSION PREVENTIVE COMPOSITIONS

[75] Inventor: Hideo Kanamori, Ichihara, Japan

[73] Assignee: Idemitsu Kosan Co., Ltd., Tokyo, Japan

[21] Appl. No.: 879,537

[22] Filed: May 4, 1992

Related U.S. Application Data

[62] Division of Ser. No. 441,373, Nov. 27, 1989, abandoned.

[30] Foreign Application Priority Data

Dec. 15, 1988 [JP] Japan .................. 63-314949

[51] Int. Cl.⁵ .................. C10M 133/50; C10M 173/02
[52] U.S. Cl. .................. 252/49.3; 252/51.5 R; 252/77; 252/392
[58] Field of Search .................. 252/49.3, 51.5 R

[56] References Cited

U.S. PATENT DOCUMENTS

| | | | |
|---|---|---|---|
| 1,903,287 | 4/1933 | Cox .................. | 252/77 |
| 2,695,291 | 11/1954 | Niederl et al. .................. | 544/177 |
| 3,036,130 | 5/1962 | Jackson et al. .................. | 544/177 |
| 3,753,912 | 8/1973 | Nankee et al. .................. | 252/51.5 R |
| 4,042,513 | 8/1977 | Meinhardt et al. .................. | 252/51.5 R |
| 4,101,433 | 7/1978 | Purcell et al. .................. | 252/49.3 |
| 4,666,461 | 5/1987 | Dorer, Jr. .................. | 544/177 |
| 4,704,217 | 11/1987 | Sweeney et al. .................. | 252/51.5 R |
| 4,734,258 | 3/1988 | Cosper .................. | 422/16 |

FOREIGN PATENT DOCUMENTS

1254938 11/1967 Fed. Rep. of Germany .

OTHER PUBLICATIONS

Chemical Abstracts, vol. 94 (1981) 31311x (of JP 80-108416).
Maeda, et al. *Tetrahedron*, vol. 38 (1982) pp. 3359-3362.
Chem Abstracts, vol. 74 (1971) No. 78124r.
Khanina et al, *Chem Abstracts*, vol. 101 (1984) No. 191,935v
Bogdal, *Chem Abstracts*, vol 65 (1966), 7173h.

*Primary Examiner*—Ellen McAvoy
*Attorney, Agent, or Firm*—Frishauf, Holtz, Goodman & Woodward

[57] ABSTRACT

A rust and corrosion preventive hydrous fluid comprising (a) 0.01% or more by weight of a rust and corrosion preventive compound of the following formula:

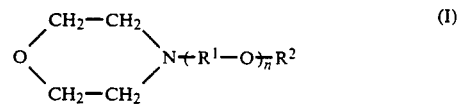

wherein n is an integer of 3 to 300, each $R^1$ is an alkylene group of 2 to 4 carbon atoms, an arylene group of 6 to 30 carbon atoms or a cycloalkylene group of 6 to 30 carbon atoms, with the proviso that the $R^1$ groups are identical with or different from one another, and $R^2$ is a hydrogen atom, an alkyl group of from 1 to 30 carbon atoms, an aryl group of from 6 to 30 carbon atoms or a cycloalkyl group of from 6 to 30 carbon atoms, and (b) water.

29 Claims, No Drawings

RUST AND CORROSION PREVENTIVE COMPOSITIONS

This application is a division of application Ser. No. 07/441,373, filed Nov. 27, 1989, now abandoned.

BACKGROUND OF THE INVENTION (a) Field of the Invention

The present invention relates to a rust and corrosion preventive compound and to its use in an additive agent for rust prevention and corrosion prevention, a base material for rust and corrosion preventive antifreezing fluids, a rust and corrosion preventive synthetic lubricant, and a rust and corrosion preventive hydrous liquid.

More specifically, the present invention relates to a novel synthetic lubricant which consists essentially of a specific morpholine compound having rust and corrosion preventing properties, having excellent abrasion resistance and anti-seizure property, and further having a high viscosity index and a good low temperature fluidity; to a novel additive agent for rust and corrosion prevention consisting essentially of the morpholine compound; and to a hydrous fluid comprising the morpholine compound and water, which has and maintains excellent rust and corrosion preventing properties and can be suitably used as, for example, hydraulic fluids and antifreezing fluids.

(b) Description of the Related Art

While there is various kinds of known lubricants, there are still the demands for lubricants which have excellent abrasion resistance and anti-seizure property, have a high viscosity index and low pour point and, further, excel in rust and corrosion preventing property.

On the other hand, the conventional antifreezing fluids and water-glycol type hydraulic fluids are hydrous fluids comprising an alkylene glycol, such as ethylene glycol, propylene glycol, and dipropylene glycol, and water. Since these hydrous fluids cause troubles of corrosion and rusting when used alone, corrosion preventives and rust preventives are added to them in practical use.

However, beside the lack of enough rust preventing and corrosion preventing properties, the conventional corrosion preventives and rust preventives cannot maintain the original rust preventing and corrosion preventing properties because of their fugacity and tendency to decompose during use, causing troubles, for example, leak-out from pipes due to corrosion and loadings of filters with corroded products.

There have also been a demand for additive agents for various kinds of lubricants and various kinds of hydrous fluids, which can improve the properties of the lubricants and hydrous fluids including rust preventing and corrosion preventing properties.

SUMMARY OF THE INVENTION

It is an object of the present invention to provide a rust and corrosion preventive morpholine compound having excellent rust preventing and corrosion preventing properties.

It is another object of the present invention to provide a novel additive agent for rust prevention and corrosion prevention, which can endow various kinds of lubricants and various kinds of hydrous fluids with excellent rust preventing and corrosion preventing properties.

It is still another object of the present invention to provide a novel synthetic lubricant which not only excels in rust preventing and corrosion preventing properties but also has other excellent properties including excellent abrasion resistance and anti-seizure property, a high viscosity index, and a good low temperature fluidity.

It is a further object of the present invention to provide a hydrous fluid which is freed from the above-described problems, has improved rust preventing and corrosion preventing properties, and maintains the good properties for a long period, and therefore, is suitable for use in antifreezing fluids, hydraulic fluids, or the base material therefor.

It is still another object of the present invention to provide a rust and corrosion preventive base material for antifreezing fluid, the base material consisting essentially of the above-described morpholine compound.

The inventor repeated studies to attain the above-described objects, and has found that specific morpholine compounds excel in rust preventing and corrosion preventing properties, are useful as rust and corrosion preventive compounds, and can endow various kinds of lubricants and hydrous fluids with rust preventing and corrosion preventing properties when mixed into them as an additive for rust prevention and corrosion prevention.

The inventor has further found that the morpholine compounds, mixtures thereof or nonaqueous compositions containing them can be used as novel synthetic lubricants (i.e., lubricant oils or base oils thereof) which have excellent abrasion resistance and anti-seizure property, a high viscosity index, a good low temperature fluidity, and rust preventing and corrosion preventing properties.

The inventor has further found that hydrous fluids containing one of the morpholine compounds or a mixture thereof and water can be used as effective rust and corrosion preventive base materials of hydrous fluid system which excel in corrosion preventing property and rust preventing property and, as well, maintain these good properties stably for a long period, and that these hydrous fluids can be used, without addition of the conventional anticorrosives nor rust preventives, as novel water-glycol hydraulic fluids or novel antifreezing fluids and exhibit excellent properties including excellent corrosion preventing and rust preventing properties and long duration of these properties, thereby ensuring a stable function over a long period.

On the basis of these knowledge, the inventor accomplished the present invention.

The present invention provides a rust and corrosion preventive compound represented by the following general formula:

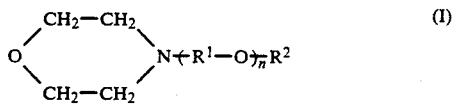 (I)

wherein n is an integer having a value of from 1 to 300, each $R^1$ is an alkylene group of from 2 to 4 carbon atoms, an arylene group of from 6 to 30 carbon atoms or a cycloalkylene group of from 6 to 30 carbon atoms, with the proviso when n is an integer having a value of 2 or more, the $R^1$ groups may be identical with or different from one another, and $R^2$ is hydrogen atom, an alkyl group of from 1 to 30 carbon atoms, an aryl group of from 6 to 30 carbon atoms or a cycloalkyl group of from 6 to 30 carbon atoms.

DESCRIPTION OF THE PREFERRED EMBODIMENTS

Hereinafter, the compound represented by the general formula (I) (Hereinafter, the compound will sometimes be referred to as morpholine compound.) to be used in the present invention will be described in more detail.

"n" in the formula (I) represents an integer having a value of from 1 to 300, preferably from 2 to 100, more preferably from 3 to 50. If the value of n exceeds 300, the viscosity of the compound will become too high to be suitable for lubricating use.

When $R^1$ in the formula (I) is an alkylene group, the typical examples of the alkylene group include 1,2-ethylene group; substituted 1,2-ethylene groups such as 1,2-propylene group, 1,2-butylene group, and 2,3-butylene group; 1,3-propylene groups; substituted 1,3-propylene groups such as 1,3-butylene group; and 1,4-butylene group.

When $R^1$ is an arylene group, the typical examples of the arylene group include 1,4-phenylene group, 1,3-phenylene group, 1,2-phenylene group; substituted 1,4-phenylene groups such as 2-methyl-1,4-phenylene group, 2,3-dimethyl-1,4-phenylene group, 2-ethyl-1,4-phenylene group, and 2-propyl-1,4-phenylene groups; substituted 1,3-phenylene groups such as 4-methyl-1,3-phenylene group and 5-methyl-1,3-phenylene group; substituted 1,2-phenylene groups such as 3-methyl-1,2-phenylene group and 4-methyl-1,2-phenylene group; naphthalene groups such as 1,4-naphthalene group and 2,5-naphthalene group; and substituted groups thereof such as alkyl substituted groups thereof.

When $R^1$ is a cycloalkylene group, the typical examples of the cycloalkylene group include 1,4-cyclohexylene group, 1,3-cyclohexylene group, 1,2-cyclohexylene group, 1,5-cyclooctylene group, 1,4-cyclooctylene group, 1,3-cyclooctylene group, 1,2-cyclooctylene group, decalin-1,2-diyl group, decalin-1,3-diyl group, decalin-1,4-diyl group, decalin-2,5-diyl group, and substituted groups thereof such as alkyl-substituted groups thereof.

Among these, the preferred $R^1$ groups are alkylene groups of from 2 to 4 carbon atoms, and the especially preferred include 1,2-ethylene group, substituted 1,2-ethylene groups such as 1,2-propylene group, 1,2-butylene group, and 2,3-butylene group, and the most preferred include 1,2-ethylene group and 1,2-propylene group.

When the "n" in the formula (I) is an integer having a value of 2 or more, the group, $-(-R^1-O-)_n-$, may consist of the $-R^1-O-$ groups of the same kind of consist of the $-R^1-O-$ groups of two or more kinds. When $-(-R^1-O-)_n-$ consists of the $-R^1-O-$ groups of two or more kinds, the $-R^1-O-$ groups may be bound to one another to form a block state, a random state or an alternative state.

When $R^2$ in the general formula (I) is an alkyl group, the typical examples of the alkyl group include linear alkyl groups such as methyl group, ethyl group, n-propyl group, isopropyl group, n-butyl group, isobutyl group, sec-butyl group, tert-butyl group, pentyl group, isopentyl group, sec-pentyl group, neopentyl group, tert-pentyl group, n-hexyl group, isohexyl group, heptyl group, octyl groups, nonyl groups, decyl groups, undecyl groups, dodecyl groups, tetradecyl groups, octadecyl groups, and eicosyl groups; and substituted alkyl groups such as benzyl group, phenehtyl group, phenylpropyl groups, and cyclohexylethyl groups.

When $R^2$ is an aryl group, the typical examples of $R^2$ include phenyl group; substituted phenyl groups such as o-methylphenyl group, m-methylphenyl group, p-methylphenyl group, p-ethylphenyl group, p-butyl phenyl groups, p-octylphenyl groups, and biphenylyl group; 1-naphthyl group; 2-naphthyl group; and substituted naphthyl groups such as methyl naphthyl groups.

When $R^2$ is a cycloalkyl group, the typical examples of the cycloalkyl group include monocyclic cycloalkyl groups such as cyclohexyl group, cycloheptyl group, cyclooctyl group, cyclodecyl group, and cyclododecyl group; polycyclic cycloalkyl groups such as decalin-1-yl group and decalin-2-yl group; and substituted cycloalkyl groups such as methylcyclohexyl groups, ethylcyclohexyl groups, and octylcyclohexyl groups.

The particularly preferred example of $R^2$ is hydrogen atom.

The compounds represented by the formula (I) may be used individually or in a mixture of two or more of them.

Among the compounds represented by the formula (I), some typical examples of the compound or mixtures thereof which may be suitably used include ethylene oxide (1 to 30 mol) adducts of morpholine, propylene oxide (1 to 30 mol) adducts of morpholine, ethylene oxide (1 to 10 mol)/propylene oxide (1 to 20 mol) adducts of morpholine, and mixtures thereof.

The rust and corrosion preventive compound of the present invention is useful in the fields where rust preventing and corrosion preventing properties are required, for example, as an additive agent for rust prevention and corrosion prevention; a synthetic lubricant; a base material (an undiluted solution) for rust and corrosion preventive hydrous liquids to be used as water-glycol type hydraulic fluids or antifreezing fluids; and a base material for antifreezing fluids.

The additive agent for rust prevention and corrosion prevention of the present invention consists essentially of one of the compounds represented by the formula (I) or a mixture of two or more of the compounds. The additive agent is mixed into various kinds of articles to endow them with excellent rust preventing and corrosion preventing properties.

The lubricant of the present invention consists essentially of one of the compounds represented by the formula (I) or a mixture of two or more of the compounds. Other than the compounds represented by the formula (I), the lubricant may contain solvents and various kinds of compounding agents or additive agents which are usually mixed into the conventional lubricating oils and/or the conventional lubricating base oils, such as mineral oil and synthetic lubricating oils.

Through the properties or action of the morpholine compound represented by the formula (I), the lubricant of the present invention has, in addition to excellent rust and corrosion preventing properties, excellent other properties including excellent abrasion resistance and anti-seizure property, a high viscosity index, and a good low temperature fluidity. By utilizing these properties, the lubricant of the present invention can be used in various kinds of fields, and is particularly suited for the purposes for which mineral oil type or synthetic oil type lubricants are used. Concretely, it can particularly effectively used as a gear oil, a bearing oil, a compressor oil, a refrigerator oil, a turbine oil, a hydraulic fluid, a vacuum pump oil, a metal working oil, a rust preventive oil, a heat treatment oil, a heat transfer oil, a grease, or a base oil therefor.

The hydrous fluid of the present invention comprises at least one compound represented by the formula (I) (component A) and water, and the hydrous fluid may be of either solution form or disperse fluid form such as emulsion. The mixing ratio of the component (A) to water is not particularly limited, but it is appropriate that the hydrous fluid contains 0.01% by weight or more of the component (A). In addition to water and the component (A), the hydrous fluid may further contain proper amounts of other components, for example, alkylene glycols, thickeners, oiliness improvers, extreme pressure agents, corrosion inhibitors, antifoaming agents, and further, lubricating base oils such as mineral oil and synthetic oils, rust preventives, and emulsifiers.

When the hydrous fluid of the present invention is used as a water-glycol type hydraulic fluid, it is appropriate that the component (A) accounts 80 to 20% by weight of the sum of the component (A) and water. Further, it is generally desirable to mix a thickener. With regard to the composition of the water-glycol type hydraulic fluid, the preferred water-glycol type hydraulic fluid consists essentially of a total of 100 parts by weight of the component (A) and water, 0 to 100 parts by weight of an alkylene glycol, 3 to 80 parts by weight of a thickener, a total of 1 to 50 parts by weight of an oiliness improver and an extreme pressure agent, and 0 to 10 parts by weight of a corrosion inhibitor.

Some typical examples of the above-described alkylene glycol which may be used in the hydrous fluid of the present invention include ethylene glycol, diethylene glycol, propylene glycol, dipropylene glycol, and butylene glycol. These may be used individually or as a mixture of two or more of them.

The particularly suitable examples of the above-described thickener include ethylene oxide-propylene oxide copolymers having a molecular weight of from about 2,000 to 50,000.

Some examples of the above-described oiliness improver which may be used in the hydrous fluid of the present invention include monocarboxylic acids, particularly fatty acids of from 8 to 30 carbon atoms, polycarboxylic acids such as dicarboxylic acids, and salts thereof with alkali hydroxides, alkylamines, and alkanolamines.

Some examples of the corrosion inhibitor which may be used in the hydrous fluid of the present invention include morpholine, cyclohexylamine, dicyclohexylamine, monoethanolamine, diethanolamine, triethanolamine, diisopropanolamine, triisopropanolamine, benzotriazole, benzothiazole, and EDTA.

The above-described additives such as alkylene glycols, thickeners, oiliness improvers, extreme pressure agents, and corrosion inhibitors are not limited to the compounds illustrated above, and any known compound may be used optionally as each additive, respectively.

When these various kinds of additive agents are to be mixed, they may be used individually or in a combination of two or more of them.

In the manner as described above, the hydrous fluid containing the morpholine compound represented by the formula (I) can be obtained.

By the action of the morpholine compound, the hydrous fluid is improved in the corrosion preventing property and the rust preventing property and as well can maintain the improved properties stably for a long period. Mainly taking advantage of the stable and durable corrosion preventing property and rust preventing property, the hydrous fluid can be used for various purposes, for example, as the water-glycol type hydraulic fluid as described above, other hydrous hydraulic fluids, antifreezing fluids, metal hydraulic fluids, heat treatment fluids for quenching, etc., coolants, heat transfer fluids, or base materials therefor.

The hydrous fluid of the present invention can be particularly suitably used as a water-glycol type hydraulic fluid and an antifreezing fluid. Accordingly, the rust and corrosion preventive compound of the present invention also can be suitably used as the base material for antifreezing fluids.

When the hydrous fluid of the present invention is used as an antifreezing fluid, the antifreezing fluid preferably comprises 100 parts by weight of the morpholine compound represented by the formula (I) (component A), from 5 to 20,000 parts by weight, more preferably from 10 to 1,000 parts by weight of water, and from 0 to 10 parts by weight, more preferably from 0.1 to 10 parts by weight of an corrosion inhibitor, such as morpholine.

Hereinafter, the present invention will be described in more details referring to the following Examples, and the Examples are illustrative and are not to be construed to limit the scope of the present invention.

EXAMPLES 1 TO 9 AND COMPARATIVE EXAMPLES 1 TO 5

Examples 1 to 8 and Comparative Examples 1 to 4

Examples 1 to 7 and Comparative Examples 1 and 2 relate mainly to water-glycol type hydraulic fluids, and in each Example, a sample fluid (test fluid) having the composition as shown in Table 1 was prepared. Measurements of the initial values of the properties shown in Table 1 were carried out on the sample fluids according to the test methods which will be described later, and an endurance test was carried out on each sample fluid by conducting an open type heat-resistance test and a closed type heat-resistance test. The results are shown in Table 1.

Example 8 and Comparative Examples 3 and 4 relate mainly to antifreezing fluids, and in each Example, a sample fluid (test fluid) having the composition as shown in Table 2 was prepared. In the same manner as in Example 1, measurements of the initial values of the properties shown in Table 2 and an endurance test were carried out. The results are shown in Table 2.

(1) Corrosion behavior test

Corrosion behavior test was conducted in accordance with the antifreezing fluid test of JIS-K-2234.

(2) Vapor inhibitability test

Vapor inhibitability test was conducted in accordance with the vapor inhibitability test for rust preventive oils of JIS-K-2246.

Into a 1-l wide-mouthed bottle placed was 100 mg of a sample fluid, and the bottle was corked with a rubber cork attached with a carbon steel F25C test piece so that the test piece was disposed 100 mm over the sample fluid surface. After allowed to stand for 72 hours at 60°±2° C., the test piece was taken from the bottle and was observed about the generation of rust.

(3) Open type heat-resistance test (Endurance test)

In to a beaker of 600 mm diameter and 90 mm height placed was 100 g of a sample fluid, and the sample fluid was heated to evaporate for 72 hours at 80° C. in a air bath chamber for lubricating oil thermostability test according to JIS-K-2540. Subsequently, the beaker was taken from the air bath chamber and was supplied with water in an amount equal to the amount of the water evaporated from the sample fluid, and measurements of the changes in properties were carried out on the water supplied sample fluid.

(4) Closed type heat-resistance test (Endurance test)

Into a pressure tight closed vessel made of SUS 304 having a bore diameter of 60 mm and a height of 100 mm placed was 500 g of a sample fluid, and was heated for 36 hours at 200° C. After the vessel was allowed to cool, measurements of the changes in properties were carried out on the sample fluid.

(5) Abrasion resistance test

In accordance with ASTM D 2670, the abrasion resistance test was carried out under the conditions of 300 rpm, 300 Lbs, and 60 minutes, and the change in the weight of the test piece before and after the test was measured.

TABLE 1

(Water-glycol type hydrolic fluid)

| | | | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|---|---|
| Composition (wt %) | | | | | | | | | | | |
| A | Morpholine.EO (3) | | 15 | | | | | | | | A commercial*4 hydraulic fluid |
| | Morpholine.PO (3) | | | 15 | | | | | | | |
| | Morpholine.PO (5) | | | | 15 | 40 | | | | | |
| | Morpholine.PO (10) | | | | | | 15 | | | | |
| | Morpholine.PO (15) | | | | | | | 15 | | | |
| | Morpholine.EO (2) PO (3) | | | | | | | | 40 | | |
| B | Water | | 38 | 39 | 40 | 41.5 | 40.5 | 43 | 39.5 | 39.5 | |
| C | Propylene glycol | | 25 | 25 | 25 | 0 | 25 | 25 | 0 | 40 | |
| | Oiliness improver*1 | | 5 | 5 | 5 | 5 | 5 | 5 | 5 | 5 | |
| | Corrosion inhibitor*2 | | 2 | 2 | 2 | 2 | 2 | 2 | 2 | 2 | |
| | Thickener*3 | | 15 | 14 | 13 | 11.5 | 12.5 | 12 | 13.5 | 13.5 | |
| Results | | | | | | | | | | | |
| Initial value | Kinematic viscosity (40° C.) cst | | 46 | 46 | 46 | 46 | 46 | 46 | 46 | 46 | 46 |
| | Pour point (°C.) | | −50> | −50> | −50> | −42.5 | −50> | −45 | −50> | −50> | −50> |
| | pH | | 11.4 | 11.3 | 11.2 | 11.4 | 11.2 | 11.1 | 11.3 | 10.5 | 11.6 |
| | Abrasion resistance (mg) | | 2.1 | 2.0 | 2.0 | 1.8 | 2.2 | 2.0 | 1.9 | 5.8 | 22.8 |
| | Volatile inhibitability | | not rusted | not rusted | not rusted | not rusted | not rusted | not rusted | not rusted | slightly rusted | slightly rusted |
| | Metal corrosion (mg/cm$^2$) | Aluminum | −0.03 | −0.03 | −0.03 | −0.03 | −0.02 | −0.03 | −0.02 | −0.06 | −0.17 |
| | | cast iron | −0.01 | −0.02 | −0.01 | 0 | 0 | −0.02 | 0 | −0.09 | −0.05 |
| | | Steel | −0.01 | −0.01 | 0 | 0 | −0.01 | 0 | 0 | −0.08 | −0.05 |
| | | Brass | −0.26 | −0.23 | −0.26 | −0.21 | −0.23 | −0.22 | −0.25 | −0.20 | −0.27 |
| | | Copper | −0.11 | −0.12 | −0.12 | −0.12 | −0.11 | −0.12 | −0.13 | −0.13 | −0.12 |
| Endurance test | Open type heat-resistance test | Appearance | not changed | not changed | not changed | not changed | not changed | not changed | not changed | not changed | reddened |
| | | pH | 11.4 | 11.3 | 11.2 | 11.4 | 11.2 | 11.0 | 11.3 | 9.5 | 8.5 |
| | | Volatile inhibitability | not rusted | not rusted | not rusted | not rusted | not rusted | not rusted | not rusted | severely rusted | severely rusted |
| | Closed type heat-resistance test | Appearance | not changed | not changed | not changed | not changed | not changed | not changed | not changed | not changed | reddening precipitation |
| | | pH | 11.3 | 11.6 | 11.1 | 11.4 | 11.1 | 11.0 | 11.3 | 9.7 | 8.9 |
| | | Abrasion Resis. (mg) | 2.1 | 2.0 | 2.0 | 1.6 | 2.1 | 2.1 | 1.9 | 5.6 | 26.5 | notes:
EO represents ethylene oxide, PO represents propylene oxide, and the numberals in the parentheses represent the numbers of molecules added.
*1Potassium salt of fatty acid (potassium oleate)
*2Morpholine.
*3Ethylene oxide-propylene oxide copolymer having a molecular weight of about 20,000.
*4A commecial hydraulic fluid comprising a dipropylene glycol-waer base as the main component, oiliness improvers, thickeners, and corrosion inhibitors.

TABLE 2

| | | (Antifreezing fluid) | | |
|---|---|---|---|---|
| | | Example 8 | Comparative Example 3 | Comparative Example 4 |
| Composition | | | | |
| Morpholine.PO (5) | | 46 | 0 | A commercial*5 working fluid |
| Propylene glycol | | 0 | 46 | |
| Corrosion inhibitor | | 4 | 4 | |
| Water | | 50 | 50 | |
| Results | | | | |
| Initial value | Kinematic viscosity (40° C.) cst | 7 | 7 | 8 |
| | Fluid point (°C.) | −50> | −50> | −50> |
| | pH | 10.8 | 9.5 | 9.2 |

TABLE 2-continued

| (Antifreezing fluid) | | | Example 8 | Comparative Example 3 | Comparative Example 4 |
|---|---|---|---|---|---|
| | Volatile inhibitability | | not rusted | rusted but not severely | rusted but not severely |
| | Metal corrosion ($mg/cm^2$) | Aluminum | −0.04 | −0.08 | −0.07 |
| | | Cast iron | −0.01 | +0.06 | +0.08 |
| | | Steel | +0.01 | −0.04 | −0.03 |
| | | Brass | −0.08 | −0.10 | −0.15 |
| | | Copper | −0.12 | −0.15 | −0.14 |
| Endurance test | Open type heat-resistance test | Appearance | not changed | not changed | Suspended matter generated |
| | | pH | 10.7 | 8.6 | 8.1 |
| | | volatile inhibitability | not rusted | severely rusted | severely rusted |
| | Closed type heat resistance test | Appearance | not changed | not changed | reddened |
| | | pH | 10.6 | 8.9 | 8.2 |

*[5] A commercial antifreezing fluid comprising ethylene glycol and water as the main components.

From the results shown in Table 1, it is apparent that the water-glycol type hydraulic fluid of the present invention excels in the following points.

That is, all water-glycol type hydraulic fluids (Examples 1 to 7) containing morpholine.EO or morpholine.PO exhibited high initial pH values (pH values of the fresh fluids), and exhibited good abrasion resistance and good vapor inhibitability. Also, there was observed no change in appearance nor decrease in pH value before and after the both endurance tests under open condition and closed condition. Further, there was no decrease in the vapor inhibitability after the open type heat-resistance test nor decrease in the abrasion resistance after the closed type heat-resistance test. On the other hand, those without morpholine.EO nor morpholine.PO (Comparative Example 1 and 2) had insufficient initial values of vapor inhibitability, and exhibited large changes in appearance after the endurance test and considerable decreases in the pH value, the rust preventive property, and the abrasion resistance.

From the results shown in Table 2, it is apparent that the antifreezing fluid which is an aqueous solution containing the morpholine compound of the present invention superiors in the properties as described above to those which contain no morpholine compound.

Example 9 and Comparative Example 5

As to a lubricant consisting of the morpholine compound of the present invention (morpholine.PO(5)) and a mineral oil (solvent refined 150 neutral oil), various kinds of properties shown in Table 3 were measured. The results are shown in Table 3.

TABLE 3

| | Example 9 | Comparative example 5 |
|---|---|---|
| Viscosity (cst) (40° C.) | 23.58 | 27.86 |
| Viscosity (cst) (100° C.) | 4.977 | 5.011 |
| Viscosity index | 142 | 105 |
| Pour point (°C.) | −50> | −17.5 |
| Abrasion resistance (mg) | 7.3 | 23.0 |
| Anti-seizure property (LOS)*[1] | 2500 | 400 |
| Rust preventing property*[2] | not rusted. | severely rusted. |

*[1] Anti-seizure property was measured in accordance with ASTM D 3233 FALEX test.
*[2] A test according to JIS K 2510 was conducted for 24 hours by using distilled water.

What is claimed is:

1. A rust and corrosion preventive hydrous fluid comprising (a) 0.01% or more by weight of a rust and corrosion preventive compound of the following formula;

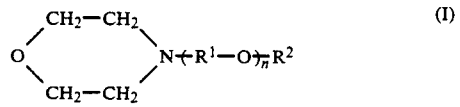

(I)

wherein n is an integer of 3 to 300, each $R^1$ is an alkylene group of 2 to 4 carbon atoms, an arylene group of 6 to 30 carbon atoms or a cycloalkylene group of 6 to 30 carbon atoms, with the proviso that the $R^1$ groups are identical with or different from one another, and $R^2$ is a hydrogen atom, an alkyl group of from 1 to 30 carbon atoms, an aryl group of from 6 to 30 carbon atoms or a cycloalkyl group of from 6 to 30 carbon atoms, and (b) water.

2. The rust and corrosion preventive hydrous fluid as claimed in claim 1, wherein $R^1$ is selected from the group consisting of a 1,2-propylene group, a 1,2-butylene group, a 2,3-butylene group, a 1,3-butylene group, a 1,4-butylene group, a 1,3-propylene group, a 2-methyl-1,4-phenylene group, a 2,3-dimethyl-1,4-phenylene group, a 2-ethyl-1,4-phenylene group, 2-propyl-1,4-phenylene group, a 4-methyl-1,3-phenylene group, a 5-methyl-1,3-phenylene group, a 3-methyl-1,2-phenylene group, a 4-methyl-1,2-phenylene group, a 1,4-naphthalene group, a 2,5-naphthalene group, a 1,4-cyclohexylene group, a 1,3-cyclohexylene group, a 1,2-cyclohexylene group, 1,5-cyclooctylene group, a 1,4-cyclooctylene group, a 1,3-cyclooctylene group, a 1,2-cyclooctylene group, a decalin-1,2-diyl group, a decalin-1,3-diyl group, a decalin-1,4-diyl group and a decalin-2,5-diyl group and $R^2$ is selected from the group consisting of a methyl group, an ethyl group, a n-propyl group, an isopropyl group, a n-butyl group, an isobutyl group, a sec-butyl group, a tert-butyl group, a pentyl group, an isopentyl group, a sec-pentyl group, a neopentyl group, a tert-pentyl group, a n-hexyl group, an isohexyl group, a heptyl group, an octyl group, a nonyl group, a decyl group, an undecyl group, a dodecyl group, a tetradecyl group, an octodecyl group, an eicosyl group, a benzyl group, a phenethyl group, a phenylpropyl group, a cyclohexylethyl group, a phenyl group, an o-methylphenyl group, a m-methylphenyl group, a p-methylphenyl group, a p-ethylphenyl group, a p-butyl phenyl group, a p-octylphenyl group, a 1-naphthyl group, a 2-naphthyl group, a methyl naphthyl group, a cyclohexyl group, a cycloheptyl group, a cyclooctyl group, a cyclodecyl group, a cyclododecyl group, a decalin-1-yl group, a decalin-2-yl group, a methylcyclohexyl group, an ethylcyclohexyl group and an octylcyclohexyl group.

3. The rust and corrosion preventive hydrous fluid as claimed in claim 1, wherein, in the formula (I), n is an integer of 3 to 100, $R^1$ is an alkylene group of 2 to 4 carbon atoms, and $R^2$ is a hydrogen atom.

4. The rust and corrosion preventive hydrous fluid as claimed in claim 3, wherein, in the formula (I), n is an integer of 3 to 50 and $R^1$ is a 1,2-ethylene group or a 1,2-propylene group.

5. The rust and corrosion preventive hydrous fluid as claimed in claim 4, wherein, in the formula (I), n is an integer of 3 to 15.

6. A rust and corrosion preventive antifreeze fluid comprising:
(a) 100 parts by weight of a rust and corrosion preventive compound of the following formula:

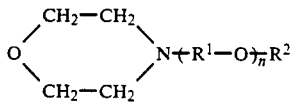                                (I)

wherein
n is an integer of from 1 to 300,
each $R^1$ is an alkylene group of 2 to 4 carbon atoms, an arylene group of 6 to 30 carbon atoms or a cycloalkylene group of 6 to 30 carbon atoms, with the proviso that the $R^1$ groups are identical with or different from one another, and
$R^2$ is hydrogen atom, an alkyl group of 1 to 30 carbon atoms, an aryl group of 6 to 30 carbon atoms or a cycloalkyl group of 6 to 30 carbon atoms,
(b) from 5 to 20,000 parts by weight of water, and
(c) from 0.1 to 10 parts by weight of a corrosion inhibitor.

7. The rust and corrosion preventive anti-freeze fluid as claimed in claim 6, wherein $R^1$ is selected from the group consisting of a 1,2-propylene group, a 1,2-butylene group, a 2,3-butylene group, a 1,3-butylene group, a 1,4-butylene group, a 1,3-propylene group, a 2-methyl-1,4-phenylene group, a 2,3-dimethyl-1,4-phenylene group, a 2-ethyl-1,4-phenylene group, 2-propyl-1,4-phenylene group, a 4-methyl-1,3-phenylene group, a 5-methyl-1,3-phenylene group, a 3-methyl-1,2-phenylene group, a 4-methyl-1,2-phenylene group, a 1,4-naphthalene group, a 2,5-naphthalene group, a 1,4-cyclohexylene group, a 1,3-cyclohexylene group, a 1,2-cyclohexylene group, 1,5-cyclooctylene group, a 1,4-cyclooctylene group, a 1,3-cyclooctylene group, a 1,2-cyclooctylene group, a decalin-1,2-diyl group, a decalin-1,3-diyl group, a decalin-1,4-diyl group and a decalin-2,5-diyl group and $R^2$ is selected from the group consisting of a methyl group, an ethyl group, a n-propyl group, an isopropyl group, a n-butyl group, an isobutyl group, a sec-butyl group, a tert-butyl group, a pentyl group, an isopentyl group, a sec-pentyl group, a neopentyl group, a tert-pentyl group, a n-hexyl group, an isohexyl group, a heptyl group, an octyl group, a nonyl group, a decyl group, an undecyl group, a dodecyl group, a tetradecyl group, an octodecyl group, an eicosyl group, a benzyl group, a phenethyl group, a phenylpropyl group, a cyclohexylethyl group, a phenyl group, an o-methylphenyl group, a m-methylphenyl group, a p-methylphenyl group, a p-ethylphenyl group, a p-butyl phenyl group, a p-octylphenyl group, a 1-naphthyl group, a 2-naphthyl group, a methyl naphthyl group, a cyclohexyl group, a cycloheptyl group, a cyclooctyl group, a cyclodecyl group, a cyclododecyl group, a decalin-1-yl group, a decalin-2-yl group, a methylcyclohexyl group, an ethylcyclohexyl group and an octylcyclohexyl group.

8. The rust and corrosion preventive antifreeze fluid as claimed in claim 6, wherein, in the formula (I), n is an integer of 2 to 100, $R^1$ is an alkylene group of 2 to 4 carbon atoms, and $R^2$ is a hydrogen atom.

9. The rust and corrosion preventive antifreeze fluid as claimed in claim 8, wherein the corrosion inhibitor is at least one selected from the group consisting of morpholine, cyclohexylamine, dicyclohexylamine, monoethanolamine, diethanolamine, triethanolamine, diisopropanolamine, triisopropanolamine, benzotriazole, benzothiazole and ethylenediaminetetraacetic acid.

10. The rust and corrosion preventive antifreeze fluid as claimed in claim 9, wherein the corrosion inhibitor is morpholine.

11. The rust and corrosion preventive antifreeze fluid as claimed in claim 8, wherein, in the formula (I), n is an integer of 3 to 50 and $R^1$ is a 1,2-ethylene group or a 1,2-propylene group.

12. The rust and corrosion preventive antifreeze fluid as claimed in claim 11, wherein, in the formula (I), n is an integer of 3 to 15.

13. The rust and corrosion preventive antifreeze fluid as claimed in claim 12, wherein, in the formula (I), n is an integer of 5, $R^1$ is a 1,2-propylene group and $R^2$ is a hydrogen, the corrosion inhibitor is morpholine and which further comprises an alkylene glycol which is propylene glycol.

14. A rust and corrosion preventive water-glycol type fluid comprising
(a) 100 parts by weight in total of a rust and corrosion preventive compound and water with the proviso that the weight ratio of the rust and corrosion preventive compound to water is of 80:20 to 20:80, said rust and corrosion preventive compound having the following formula:

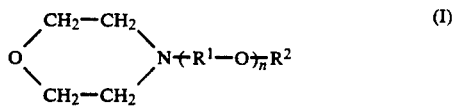                                (I)

wherein
n is an integer of 1 to 300,
each $R^1$ is an alkylene group of 2 to 4 carbon atoms, an arylene group of 6 to 30 carbon atoms or a cycloalkylene group of 6 to 30 carbon atoms, with the proviso that the $R^1$ groups are identical with or different from one another, and
$R^2$ is a hydrogen atom, an alkyl group of 1 to 30 carbon atoms, an aryl group of 6 to 30 carbon atoms or a cycloalkyl group of 6 to 30 carbon atoms,
(b) from 0 to 100 parts by weight of an alkylene glycol,
(c) from 3 to 80 parts by weight of a thickener, (d) from 1 to 50 parts by weight of an oiliness improver, and (e) from 0 to 10 parts by weight of a corrosion inhibitor.

15. The rust and corrosion preventive water-glycol type fluid as claimed in claim 14, wherein $R^1$ is selected from the group consisting of a 1,2-propylene group, a 1,2-butylene group, a 2,3-butylene group, a 1,3-butylene group, a 1,4-butylene group, a 1,3-propylene group, a 2-methyl-1,4-phenylene group, a 2,3-dimethyl-1,4-phenylene group, a 2-ethyl-1,4-phenylene group, 2-propyl-1,4-phenylene group, a 4-methyl-1,3-phenylene group, a 5-methyl-1,3,-phenylene group, a 3-methyl-1,2-phenylene group, a 4-methyl-1,2-phenylene group, a 1,4-naphthalene group, a 2,5-naphthalene group, a 1,4-cyclohexylene group, a 1,3-cyclohexylene group, a 1,2-cyclohexylene group, 1,5-cyclooctylene group, a 1,4-cyclooctylene group, a 1,3-cyclooctylene group, a 1,2-cyclooctylene group, a decalin-1,2-diyl group, a decalin-1,3-diyl group, a decalin-1,4-diyl group and a decalin-2,5-diyl group and $R^2$ is selected from the group consisting of a methyl group, an ethyl group, a n-propyl group, an isopropyl group, a n-butyl group, an isobutyl group, a sec-butyl group, a tert-butyl group, a pentyl group, an isopentyl group, a sec-pentyl group, a neopentyl group, a tert-pentyl group, a n-hexyl group, an isohexyl group, a heptyl group, an octyl group, a nonyl group, a decyl group, an undecyl group, a dodecyl group, a tetradecyl group, a octodecyl group, an eicosyl group, a benzyl group, a phenethyl group, a phenylpropyl group, a cyclohexylethyl group, a phenyl group, an o-methylphenyl group, a m-methylphenyl group, a p-methylphenyl group, a p-ethylphenyl group, a p-butyl phenyl group, a p-octylphenyl group, a 1-naphthyl group, a 2-naphthyl group, a methyl naphthyl group, a cyclohexyl group, a cycloheptyl group, a cyclooctyl group, a cyclodecyl group, a cyclododecyl group, a decalin-1-yl group, a decalin-2-yl group, a methylcyclohexyl group, an ethylcyclohexyl group and an octylcyclohexyl group.

16. The rust and corrosion preventive water-glycol type fluid as claimed in claim 14, wherein, in the formula (I), n is an integer having a value of 2 to 100, $R^1$ is an alkylene group of 2 to 4 carbon atoms, and $R^2$ is a hydrogen atom.

17. The rust and corrosion preventive water-glycol type fluid as claimed in claim 16, wherein the alkylene glycol is at least one selected from the group consisting of ethylene glycol, diethylene glycol, propylene glycol, dipropylene glycol and butylene glycol.

18. The rust and corrosion preventive water-glycol type fluid as claimed in claim 16 wherein the thickener is an ethylene oxide-propylene oxide copolymer having a molecular weight of about 2,000 to 50,000.

19. The rust and corrosion preventive water-glycol type fluid as claimed in claim 16, wherein the oiliness improver is at least one selected from the group consisting of a monocarboxylic acid, a polycarboxylic acid and a salt thereof with an alkali hydroxide, an alkylamine or an alkanolamine.

20. The rust and corrosion preventive water-glycol type fluid as claimed in claim 16, wherein, in the formula (I), n is an integer of 3 to 50 and $R^1$ is a 1,2-ethylene group or a 1,2-propylene group.

21. The rust and corrosion preventive water-glycol type fluid as claimed in claim 20, wherein, in the formula (I), n is an integer of 3 to 15.

22. The rust and corrosion preventive water-glycol type fluid as claimed in claim 21, wherein the alkylene glycol is propylene glycol, the thickener is an ethylene oxide-propylene oxide copolymer, the oiliness improver is a mixture of potassium salts of fatty acids, and the corrosion inhibitor is morpholine.

23. The rust and corrosion preventive water-glycol type fluid as claimed in claim 14, further comprising an extreme pressure agent, wherein the fluid comprises (a) 100 parts by weight in total of the rust and corrosion preventive compound and the water with the proviso that the weight ratio of the rust and corrosion preventive compound to the water is 80:20 to 20:80, (b) from 0 to 100 parts by weight of the alkylene glycol, (c) from 3 to 80 parts by weight of the thickener, (d) from 1 to 50 parts by weight of the total of the oiliness improver and the extreme pressure agent, and (e) from 0 to 10 parts by weight of a corrosion inhibitor.

24. The rust and corrosion preventive water-glycol type fluid as claimed in claim 23, wherein, in the formula (I), n is an integer of 2 to 100, $R^1$ is an alkylene group of 2 to 4 carbon atoms, and $R^2$ is a hydrogen atom.

25. The rust and corrosion preventive water-glycol type fluid as claimed in claim 23, wherein the alkylene glycol is at least one selected from the group consisting of ethylene glycol, diethylene glycol, propylene glycol, dipropylene glycol and butylene glycol.

26. The rust and corrosion preventive water-glycol type fluid as claimed in claim 23, wherein the thickener is an ethylene oxide-propylene oxide copolymer having a molecular weight of about 2,000 to 50,000.

27. The rust and corrosion preventive water-glycol type fluid as claimed in claim 23, wherein the oiliness improver is at least one selected from the group consisting of a monocarboxylic acid, a polycarboxylic acid and a salt thereof with an alkali hydroxide, an alkylamine or an alkanolamine.

28. The rust and corrosion preventive water-glycol type fluid as claimed in claim 24, wherein, in the formula (I), n is an integer of 3 to 50 and $R^1$ is a 1,2-ethylene group or a 1,2-propylene group.

29. The rust and corrosion preventive water-glycol type fluid as claimed in claim 28, wherein, in the formula (I), n is an integer of 3 to 15.

* * * * *